US012235787B2

(12) United States Patent
Gutierrez et al.

(10) Patent No.: US 12,235,787 B2
(45) Date of Patent: Feb. 25, 2025

(54) CRYPTOCURRENCY MINER AND MULTICAST READ

(71) Applicant: Chain Reaction Ltd., Yokneam (IL)

(72) Inventors: Rony Gutierrez, Pardes Hanna-Karkur (IL); Michael Tal, Yoqneam Illit (IL); Zvi Shteingart, Moscow (RU)

(73) Assignee: CHAIN REACTION LTD., Yokneam (IL)

( * ) Notice: Subject to any disclaimer, the term of this patent is extended or adjusted under 35 U.S.C. 154(b) by 0 days.

(21) Appl. No.: 17/889,084

(22) Filed: Aug. 16, 2022

(65) Prior Publication Data

US 2024/0061801 A1 Feb. 22, 2024

(51) Int. Cl.
*G06F 13/42* (2006.01)
*G06Q 20/06* (2012.01)

(52) U.S. Cl.
CPC ......... *G06F 13/4282* (2013.01); *G06Q 20/06* (2013.01)

(58) Field of Classification Search
None
See application file for complete search history.

(56) References Cited

U.S. PATENT DOCUMENTS

| | | | | |
|---|---|---|---|---|
| 6,157,955 A * | 12/2000 | Narad | ................. | H04L 49/9031 |
| | | | | 709/228 |
| 9,294,386 B2 * | 3/2016 | Narad | ................... | G06F 9/3885 |
| 2017/0102756 A1 * | 4/2017 | Wang | ................. | G06F 11/3048 |
| 2017/0237770 A1 * | 8/2017 | Meriac | ................... | H04L 67/12 |
| | | | | 726/23 |
| 2018/0204111 A1 * | 7/2018 | Zadeh | ................. | G06V 10/764 |
| 2019/0129880 A1 * | 5/2019 | Zhu | ................ | G06F 13/4282 |
| 2020/0059485 A1 * | 2/2020 | Ergin | ................ | H04L 47/2441 |
| 2020/0341934 A1 * | 10/2020 | Abdul Kalam | ..... | G06F 13/1673 |
| 2021/0194672 A1 * | 6/2021 | Narayanam | ........... | G06F 9/4418 |
| 2023/0281053 A1 * | 9/2023 | Kundu | ................. | G06F 9/5083 |
| | | | | 718/105 |
| 2023/0283691 A1 * | 9/2023 | Kundu | ................... | H04L 67/61 |
| | | | | 455/414.1 |
| 2023/0284074 A1 * | 9/2023 | Kundu | ............. | H04W 28/0242 |
| | | | | 370/329 |

(Continued)

FOREIGN PATENT DOCUMENTS

| | | |
|---|---|---|
| EP | 3281115 | 2/2018 |
| WO | 2015077378 A1 | 5/2015 |

OTHER PUBLICATIONS

International Search Report and Written Opinion for PCT/IB2023/055948, mailed Sep. 27, 2023, 8 pages.

(Continued)

*Primary Examiner* — Henry Tsai
*Assistant Examiner* — Christopher A Bartels
(74) *Attorney, Agent, or Firm* — McAndrews, Held & Malloy, Ltd.

(57) ABSTRACT

Multicast reading of compute module registers is disclosed. A cryptocurrency miner comprises a serial bus, compute modules, and a miner controller coupled to the compute modules via the serial bus. The miner controller issues a multicast read command via the serial bus and receives values from respective registers of a first plurality of compute modules. The miner controller may initialize the compute modules with register set configurations that identify respective registers and latencies for returning values from such registers.

20 Claims, 6 Drawing Sheets

(56) References Cited

U.S. PATENT DOCUMENTS

2023/0284185 A1* 9/2023 Kundu .................. G06F 9/547
                                                            370/329

OTHER PUBLICATIONS

Sharma, Shruti. "BitFed, A Centralized Cryptocurrency with Distributed Miners." (2015). <https://scholarworks.sjsu.edu/cgi/viewcontent.cgi?article=1427&context=etd_projects> Dec. 31, 2015.

Xu C, Zhang C, Xu J, Pei J. SlimChain: Scaling blockchain transactions through off-chain storage and parallel processing. Proceedings of the VLDB Endowment. Jul. 1, 2021;14 (11):2314-26. Jul. 1, 2021.

"AsicBoost—A Speedup for Bitcoin Mining", Dr. Timo Hanke, Mar. 31, 2016, 10 pages.

"Crypto Mining: Network Difficulty, Share Difficulty and Hash Functions", Luxor Tech, Feb. 20, 2020, 6 pages.

"Mastering Bitcoin", Andreas M. Antonopoulos, Published by O'Reilly Media, Inc. 2010, 87 pages.

Federal Information Processing Standards Publication, Aug. 2015, 36 pages.

"Optimising the SHA256 Hashing Algorithm for Faster and More Efficient Bitcoin Mining", Rahul P. Naik, Department of Computer Science, University College of London, Sep. 2, 2013, 65 pages.

BitmainAntminer—Youtube video, https://www.youtube.com/watch?v=_R36wWMM34M.

MicroBT Whatsmainer—Youtube video, https://www.youtube.com/watch?v=6vtq1m8w5eQ.

SHA-256 The Center of Bitcoin—Andreas M. Antonopoulos—Youtube video, https://www.youtube.com/watch?v=TvqDbLnsSNs.

* cited by examiner

CRYPTOCURRENCY MINER AND MULTICAST READ

BACKGROUND

Cryptocurrency is a digital asset designed to work as a medium of exchange. Individual coin ownership records are stored in a ledger or blockchain. Unlike conventional currencies, cryptocurrency does not typically exist in a physical form and is typically not issued by a central authority.

A blockchain provides a continuously growing list of records, called blocks, which are linked and secured using cryptography. Each block typically contains a hash pointer as a link to a previous block, a timestamp, and transaction data. By design, blockchains are inherently resistant to modification of the data. A blockchain is typically managed by a peer-to-peer network collectively adhering to a protocol for validating new blocks. Once recorded, the data in any given block cannot be altered retroactively without the alteration of all subsequent blocks, which requires collusion of the network majority.

In cryptocurrency networks, miners validate cryptocurrency transactions of a new candidate block for the blockchain via a Proof-of-Work algorithm. A side effect of validating the candidate block is the creation of newly minted cryptocurrency. The newly minted cryptocurrency as well as associated service fees are awarded to the miner that was the first miner to validate the candidate block and thus complete the Proof-of-Work algorithm.

This winner-takes-all compensation scheme has created an arms race for more efficient miners. Furthermore, mining pools have developed in an attempt to lessen the risks associated with the winner-takes-all compensation scheme. Miners or members of a mining pool share their processing power and split any obtained reward among the members according to the amount of work they contributed.

Limitations and disadvantages of conventional and traditional cryptocurrency mining approaches will become apparent to one of skill in the art, through comparison of such approaches with the present disclosure as set forth in the remainder of the present disclosure with reference to the drawings.

SUMMARY

Figure 1:
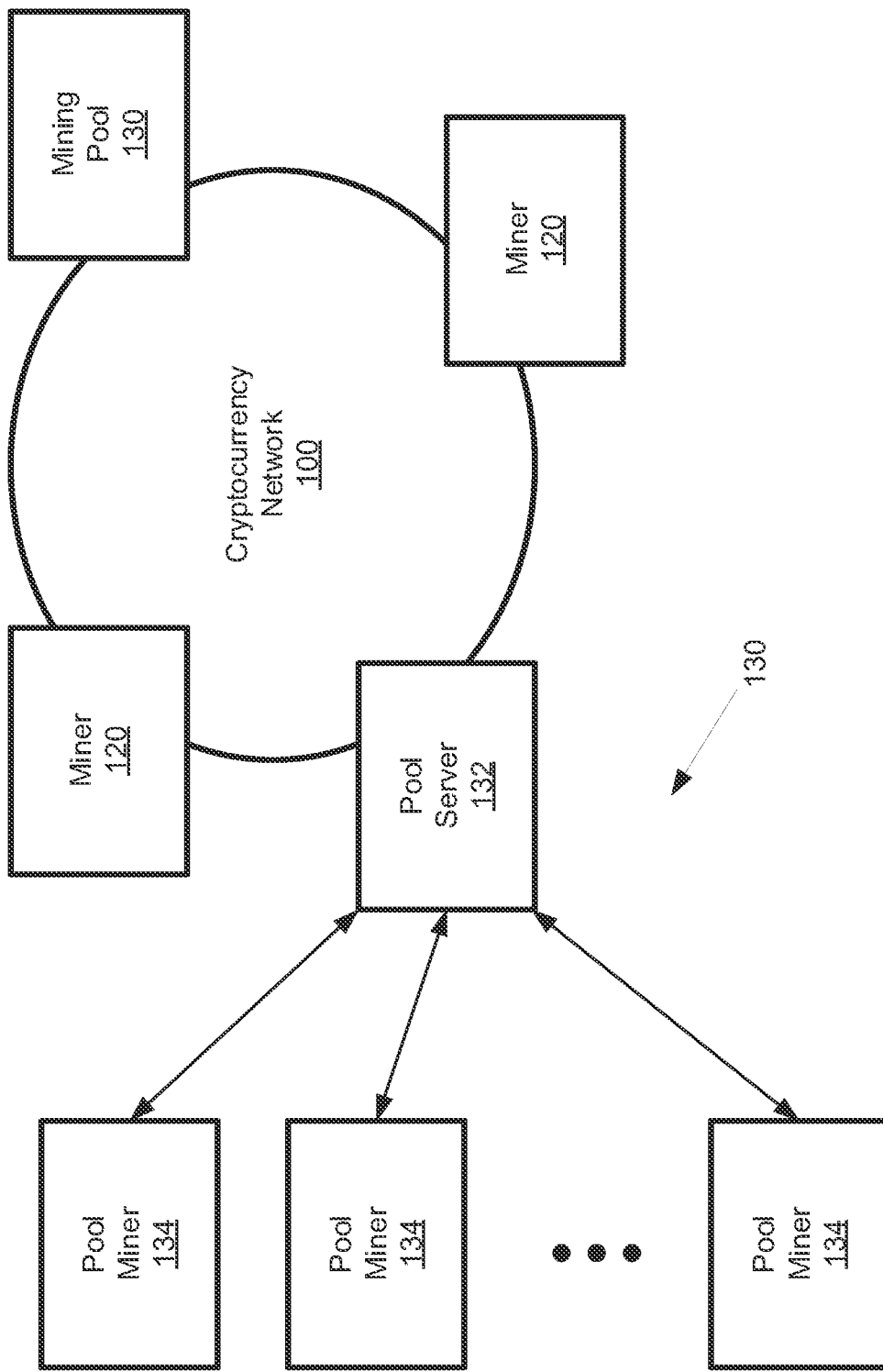
FIG. 1 shows a cryptocurrency network comprising miners in accordance with various aspects of the present disclosure.

Cryptocurrency miners and associated methods and apparatus are substantially shown in and/or described in connection with at least one of the figures, and are set forth more completely in the claims.

Advantages, aspects, and novel features of the present disclosure, as well as details of illustrated embodiments, will be more fully understood from the following description and drawings.

DETAILED DESCRIPTION OF VARIOUS ASPECTS OF THE DISCLOSURE

Various aspects of the present disclosure are presented by way of example. Such examples are non-limiting, and thus the scope of various aspects of the present disclosure should not necessarily be limited by any particular characteristics of the provided examples. In the following, the phrases "for example," "e.g.," and "exemplary" are non-limiting and are generally synonymous with "by way of example and not limitation," "for example and not limitation," and the like.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z."

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section could be termed a second element, a second component, or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a component may be turned sideways so that its "top" surface is facing horizontally and its "side" surface is facing vertically, without departing from the teachings of the present disclosure.

In the drawings, various dimensions (e.g., thicknesses, widths, lengths, etc.) may be exaggerated for illustrative clarity. Additionally, like reference numbers are utilized to refer to like elements through the discussions of various examples.

The discussion will now refer to various example illustrations provided to enhance the understanding of the various aspects of the present disclosure. It should be understood that the scope of this disclosure is not limited by the specific characteristics of the examples provided and discussed herein.

Referring now to FIG. 1, an embodiment of a cryptocurrency network 100 is shown. In particular, the cryptocurrency network 100 may be implemented as a Bitcoin network. The present disclosure focuses primarily upon Bitcoin and the Bitcoin network. However, aspects of the present disclosure are also applicable to other cryptocurrencies, also referred to as Altcoin, such as, for example, Litecoin, Dogecoin, Ethereum, etc. and their respective networks. Similarly, the present disclosure focuses primarily on aspects of mining pool miners that are members of a Bitcoin mining pool. However, aspects of the present disclosure are also applicable to standalone miners, distributed miners, and/or mining pool miners of Bitcoin and/or Altcoin networks.

As shown, the cryptocurrency network 100 may include multiple miners 120 (e.g., standalone miners and/or distributed miners) and multiple mining pools 130, which are operably coupled to one another via various networks such as LANs, WANs, cellular, satellite, and/or communication networks. The miners 120 and mining pools 130 of the cryptocurrency network compete with each other in a decentralized manner to create a new block of processed Bitcoin transactions (e.g., transfers of Bitcoin between parties), and add the newly created block to the blockchain for the cryptocurrency network 100.

The blockchain is essentially a growing list or ledger of cryptographically linked records of transactions called blocks. Each block includes a cryptographic hash of the previous block, a timestamp, transaction data, and potentially other fields. The blocks form a chain, with each additional block reinforcing the ones before it. As such, blockchains are resistant to modification because any given block cannot be altered retroactively without altering all subsequent blocks.

The creation of a new block is designed to be computationally intensive so as to require the cryptocurrency network 100 to spend a specified amount of time on average to create a new block. For example, the Bitcoin network is designed to create and add a new block to the blockchain every 10 minutes on average. The cryptocurrency network 100 periodically adjusts the computational difficulty of creating a new block to maintain the 10 minute target. In this manner, the cryptocurrency network 100 may create new blocks in a relatively steady manner despite ever changing computational capacity. For example, adding new miners 120, mining pool miners 134, and/or mining pools 130 to the cryptocurrency network 100 increases the overall computational capacity of the cryptocurrency network 100. Such increased computational capacity reduces the time required to create and add a new block to blockchain. However, the cryptocurrency network 100 periodically adjusts the computational difficulty of creating a new block to maintain the 10 minute target. As a result, the cryptocurrency network 100 eventually detects that blocks are being created at a rate faster than the 10 minute target and appropriately increases the difficulty of creating a new block so as to counteract the increased computational capacity and maintain the roughly 10 minutes per block average.

To incentivize parties to undertake the computationally difficult task of generating a new block, the cryptocurrency network 100 compensates the miners 120 and mining pools 130 for their efforts. In particular, each new block generates a quantity of new currency (e.g., 6.25 Bitcoins) as well as service fees from all transactions in the block. These new coins and service fees are awarded to the first entity (e.g., miner 120 or mining pool 130) that solves the Proof-of-Work algorithm for the next block to be added to the blockchain. The Proof-of-Work algorithm is essentially a computationally intensive process that creates a new block that satisfies a cryptographic hash target. Thus, the miners 120 and mining pools 130 are in competition with one another since only the first entity to solve the Proof-of-Work algorithm receives the associated block award.

Given the all or nothing nature of the block awards, mining pools 130 have formed. In general, a mining pool 130 includes a pool server 132 and several mining pool miners or members 134. The pool server 132 divides the Proof-of-Work into substantially smaller jobs and distributes such smaller jobs to the mining pool miners 134 in the mining pool 130. By completing smaller jobs, mining pool miners 134 obtain shares of a block award won by the mining pool 130. In this manner, each of the mining pool miners 134 may earn a smaller award (e.g., a share of a block award proportional to their contribution to completing the Proof-of-Work) on a more frequent basis than if each of the mining pool miners 134 were operating as a miner 120 on its own.

Figure 2:
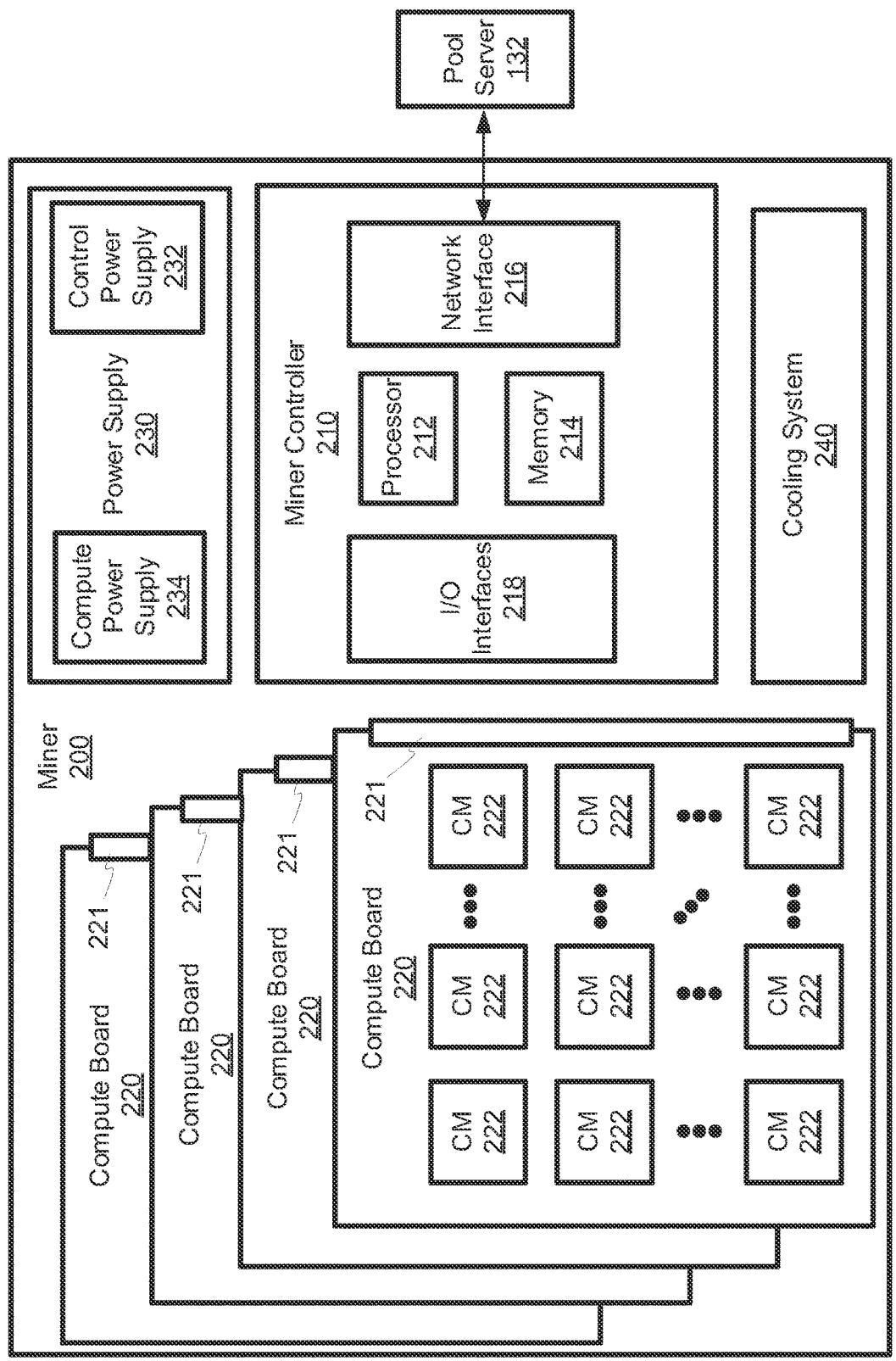
FIG. 2 shows a block diagram of a miner of FIG. 1.

A block diagram of a miner 200 is shown in FIG. 2, which is suitable for implementing one of the mining pool miners 134 of the mining pool 130. As shown, the miner 200 includes a miner controller 210, compute boards 220, a power supply 230, and a cooling system 240.

The miner controller 210 generally manages the components of the miner 200. In particular, the miner controller 210 interacts with pool server 132 on the behalf of the compute boards 220. To this end, the miner controller 210 obtains jobs from the pool server 132, distributes the jobs to the compute boards 220, and submits Proof-of-Work to the pool server 132 for the jobs completed by the compute boards 220.

As shown, the miner controller 210 may include a processor 212, memory 214, a network interface 216, and various input/output (I/O) interfaces 218. The processor 212 may be configured to execute instructions, manipulate data, and generally control operation of the other components of the miner 200 as a result of its execution. To this end, the processor 212 may include a general-purpose processor such as an x86 processor or an ARM processor, which are available from various vendors. However, the processor 212 may also be implemented using an application specific processor, programmable gate arrays, and/or other logic circuitry.

The memory 214 may store instructions and/or data to be executed and/or otherwise accessed by the processor 212. In some embodiments, the memory 214 may be completely and/or partially integrated with the processor 212. The memory 214 may store software and/or firmware instructions, which may be executed by processor 212. The memory 214 may further store various types of data which the processor 212 may access, modify, and/or otherwise manipulate in response to executing instructions from memory 214. To this end, the memory 214 may comprise volatile and/or non-volatile storage devices such as random-access memory (RAM) devices, read only memory (ROM) devices, flash memory devices, solid state device (SSD) drives, etc.

The network interface 216 may enable the miner 200 to communicate with other computing devices such as the pool server 132. In particular, the network interface 216 may permit the processor 212 to obtain jobs from the pool server 132 and submit completed jobs to the pool server 132. To this end, the networking interface 216 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, 5G, etc.), and/or some other type of networking interface capable of providing a communications link between the miner 200 and other devices such as the pool server 132.

Finally, the I/O interfaces 218 may generally provide communications and control paths between the processor 212 and other components of the miner 200 such as the compute boards 220, power supply 230, and cooling system 240. Via such interfaces, the processor 212 may control the operation of such components. For example, the processor 212 may use such I/O interfaces 218 to initialize the compute boards 220, distribute jobs to the compute boards 220, receive completed jobs from the compute boards 220, selectively enable/disable the power supply 230, and selectively turn on/off cooling system 240, among other things.

In various embodiments, the one or more I/O interfaces 218 include communication interfaces such as a Serial Peripheral Interface (SPI) interface and/or an Inter-Integrated Circuit (I2C) interface via which the processor 212 may communicate with the compute boards 220. In particular, each compute board 220 may include a board connector and/or communication interface 221. A bus such as, for example, a four-wire SPI serial bus may connect the compute modules 222 of the compute boards 220 to the miner controller 210 via the board connector 221 and their respective SPI interfaces. In such an embodiment, the miner controller 210 and compute modules 222 may operate in a master-slave arrangement, wherein the miner controller 210 acts as the single master of the bus and each of the compute modules 222 operate as slaves on the bus. In such embodiments, the miner controller 210 may assign jobs to the compute modules 222 and the compute modules 222 may push completed jobs to the miner controller 210 upon completion. In various embodiments, the miner controller 210 and compute modules 222 utilize an SPI interface and associated bus segments to communicate. However, other interconnect technologies may be used in other embodiments.

Each compute board 220 may include a board connector 221 and several compute modules 222 coupled to the board connector 221 via one or more bus segments. Each compute module 222, likewise, may include several compute engines 226 (see, e.g., FIG. 3) that perform computational aspects of completing a job. In various embodiments, each compute module 222 is implemented via an application specific integrated circuit (ASIC). However, the compute modules 222 and their respective compute engines 226 may be provided by other forms of circuitry such as field programmable gate arrays (FPGAs).

In various embodiments, a miner 200 includes 4 compute boards, each compute board 220 includes 28 compute modules 222, and each compute module 222 includes 12 compute engines 226. Such a miner 200 thus provides 1,344 (4×28×12) compute engines 226. The above quantities of compute boards 220, compute modules 222, and compute engines 226 were provided merely for context. Other embodiments of the miner 200 may include different quantities of such components.

Per the Bitcoin standard, a candidate block header must have a message digest or hash value that satisfies a current target value in order to be deemed a valid block header suitable for adding to the blockchain. Such a message digest is computed per a double SHA256 hash of the block header. Specifically, a compute engine 226 generates a double SHA256 hash of a candidate block header by computing a first message digest or hash value of the candidate block header per the SHA256 algorithm specified by Federal Information Processing Standards Publication 180-4 (FIPS Pub. 180-4). The compute engine 226 then computes a second message digest or final hash value of the candidate block header by performing a SHA256 hash of the first message digest. Thus, the compute engine 226 performs a double hash of the candidate block header to determine whether its double hash value satisfies a target value and is therefore a valid block header. Thus, for Bitcoin and various Altcoin embodiments of the miner 200, the compute boards 220 may also be referred to as hashing boards 220 since the compute engines 226 perform various hashing functions and/or various cryptographic algorithms addressing a similar goal as such hashing functions.

While Bitcoin and some other cryptocurrencies utilize the SHA256 hashing algorithm as part of their Proof-of-Work algorithms, other cryptocurrencies may use other cryptographic and/or hashing algorithms as part of their Proof-of-Work algorithm. For example, Litecoin and Dogecoin use the scrypt key-derivation function and Ethereum uses the Ethash algorithm. Thus, for embodiments of the miner 200 designed to mine such Altcoins, the compute boards 220 may include compute modules 222 designed to compute these other cryptographic algorithms.

The power supply 230 generally converts alternating current (AC) voltage to a direct current (DC) voltage suitable for the compute boards 220 and other components of the miner 200. In various embodiments, the power supply 230 receives 220V AC voltage from, for example, a wall mains outlet and efficiently converts the received power to one or more DC voltages distributed to various components of the miner 200. As shown, the power supply 230 may include a control power supply 232, one or more compute power supplies 234, as well as other power supplies. The control power supply 232 may supply control power (e.g., via one or more supplied DC voltages) used to power a control power domain of the compute boards 220. The one or more compute power supplies 234 may supply compute power (e.g., via one or more supplied DC voltages) used to power a compute power domain of the compute boards 220.

In various embodiments, the control power supply 232 and compute power supply 234 are selectively enabled via one or more signals of the miner controller 210. As such, the miner controller 210 may selectively enable/disable the power supplies 232, 234 so as to selectively power-up/power-down the respective power domains of the compute boards 220. For example, the miner controller 210 may power-up the control power domain of the compute boards 220 in order to configure and confirm operation of the compute boards 220 before powering-up the compute domain, which in certain embodiments consumes substantially more power than the control power domain.

The cooling system 240 generally comprises active thermal components (e.g., cooling fans, liquid cooling systems, Peltier cooling modules, etc.) that aid in maintaining the other components of the miner 200, especially the compute boards 220, within a thermal envelope associated with high operating efficiency. Beyond the active thermal components of the cooling system 240, the miner 200 may include other passive thermal components such as heat sinks, heat pipes, thermal paste, etc. that further aid in maintaining the components of the miner 200 within the desired thermal envelope.

Figure 5:
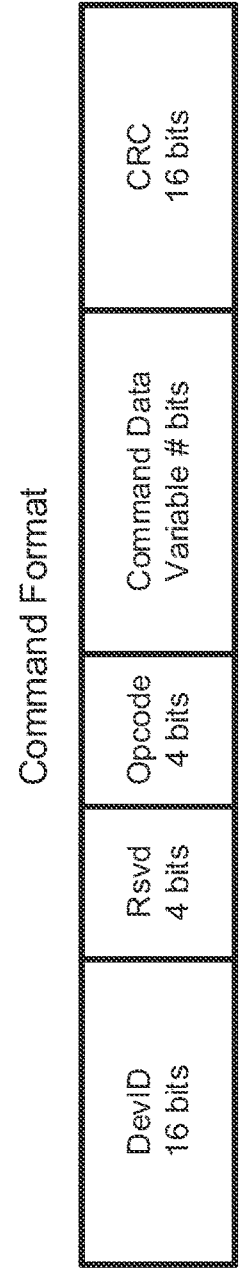
FIG. 5 shows an example command format used by the miner controller of FIG. 2.

In various embodiments, the miner controller 210 and compute modules 222 are coupled to one another via one or more busses (e.g., one or more SPI buses, I2C buses, etc.) Moreover, the miner controller 210 and compute modules 222 may interact via master-slave protocols in which the miner controller 210 operates as the master and the compute modules 222 operate as slaves. To this end, the miner controller 210 may control the operation of the compute modules via commands issued over the one or more busses, which couple the compute modules 222 to the miner controller 210. A general format for such commands is shown in FIG. 5, which is described below.

Figure 3:
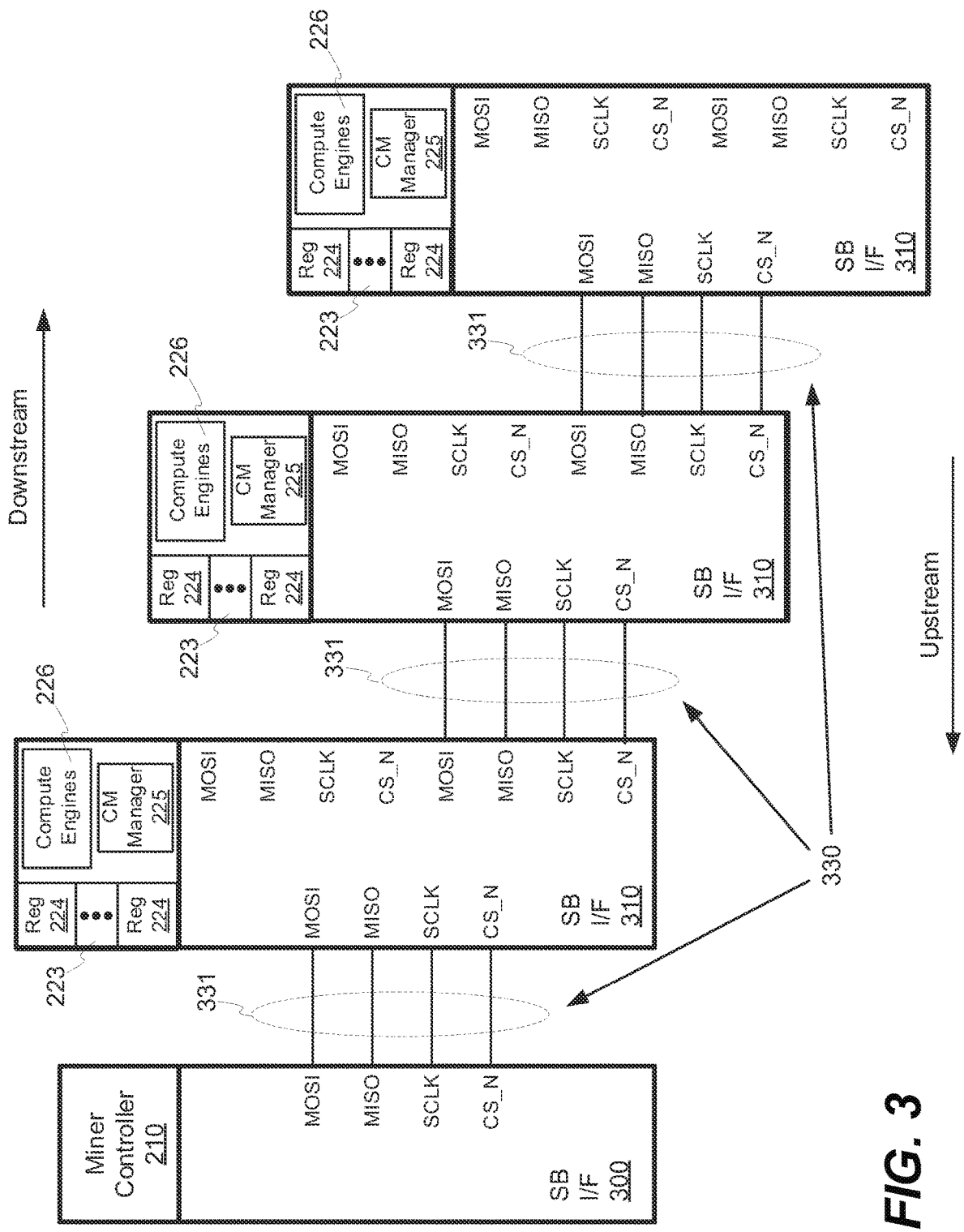
FIG. 3 depicts the miner controller of FIG. 2 coupled to compute modules via a serial bus.

Referring now to FIG. 3, the miner controller 210 may be coupled to the compute modules 222 via a serial bus 330. In particular, the I/O interfaces 218 of the miner controller 210 may include a serial bus interface 300 that is operatively coupled to serial bus interfaces 310 of the compute modules 222 via serial bus segments 331. In various embodiments, the serial bus interface 300 of the miner controller 210 includes an SPI master interface controller, each serial bus interface 310 of the compute modules 222 includes an SPI slave interface controller, and the serial bus segments 331 include SPI four-wire bus segments. As such, the miner controller 210 may communicate with the compute modules 222 via an SPI protocol over the four-wire SPI bus segments of the serial bus 330.

As shown, the serial bus interface 300 of the miner controller 210 may include a downstream Master Output Slave Input (MOSI) port, a downstream Master Input Slave Output (MISO) port, a downstream Serial Clock (SCLK) port, and a downstream Chip Select (CS_N) port. Each serial bus interface 310 of the compute modules 222 may include an upstream MOSI port, an upstream MISO port, an upstream SCLK port, and an upstream CS_N port. Furthermore, each serial bus interface 310 of the compute modules 222 may includes one or more sets of downstream ports, where each set of downstream ports includes a downstream MISO port, a downstream SCLK port, and a downstream CS_N port. As shown, bus segments 331 of the serial bus 330 may couple respective downstream MOSI, MISO, SCLK, and CS_N ports of the miner controller 210 and/or compute modules 222 to respective upstream MOSI, MISO, SCLK, and CS_N ports of the compute modules 222. To this end, each bus segment 331 may include a MOSI line, a MISO line, CS_N line, and a SCLK line coupled to respective ports of the miner controller 210 and compute modules 222.

For the sake of clarity, only three compute modules 222 are depicted in FIG. 3. However, embodiments of the miner 200 are likely to include more than three compute modules 222 (e.g., 28 compute modules). In such embodiments, additional compute modules 222 may be added to the topology shown in FIG. 3 by continuing the depicted chain of devices from last compute module 222 in the chain. Furthermore, while various embodiments may utilize a SPI four-wire bus and associated SPI protocol, embodiments of the present disclosure may utilize other buses and/or protocols to operatively couple the miner controller 210 to the compute modules 222 without departing from the spirit and scope of the appended claims.

As further shown, each of the compute modules 222 may include a register file 223, a compute module manager 225, and compute engines 226. As noted above, the compute engines 226 may compute cryptographic hashes or message digests in pursuit of a valid block header for a blockchain. To this end, the compute module manager 225 may receive jobs from miner controller 210 via its serial bus interface 310 and distribute the jobs to the compute engines 226.

The register file 223 may include a plurality of registers 224 with associated addresses. The following generally describes techniques for accessing data stored in registers 224 of the register file 223. However, in various embodiments, similar techniques may be used to access data stored in other storage elements (e.g., random-access memory (RAM), flash memory, flip-flops, etc.) integrated in or otherwise associated with the compute module 222. The compute module manager 225 may utilize the registers 224 of the register file 223 to store various configuration, status information, and/or job result information for the respective compute module 222. For example, each compute module manager 225 may store one or more unicast and/or multicast addresses in respective registers 224. The compute module manager 225 may utilize such unicast and/or multicast addresses in registers 224 to determine whether a command issued by the miner controller 210 is directed to the compute module 222.

Further, each compute module manager 225 may store register set (RegSet) configuration parameters in registers 224 of the register file 223. The miner controller 210 may utilize such RegSet configuration parameters to pre-configure or pre-define sets of registers 224 for subsequent register set reads via a single multicast read register set (MCAST_READ_REG) command.

Figure 4:
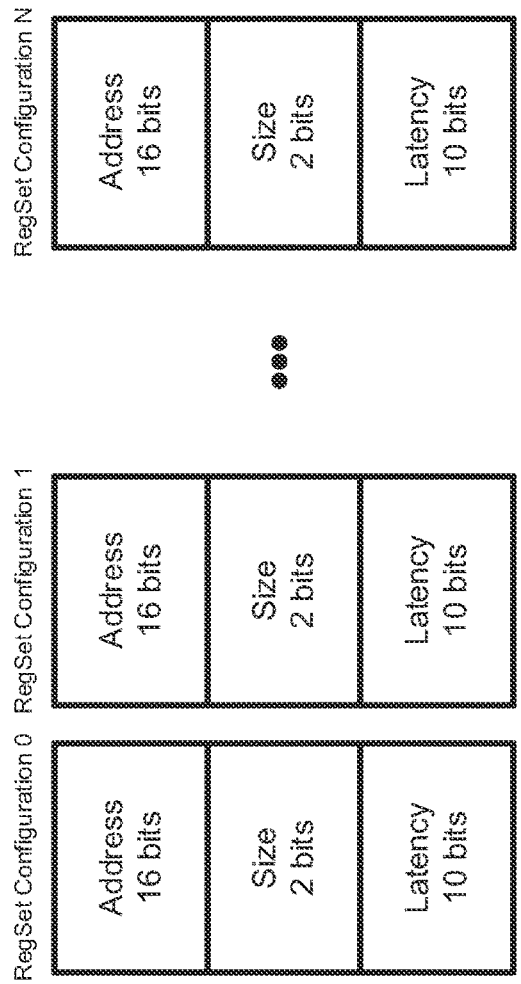
FIG. 4 depicts multiple register set configurations for a compute module of FIG. 2.

As shown in FIG. 4, each compute module manager 225 may store multiple RegSet configurations for its compute module 222 in its register file 223. The multiple RegSet configurations may collectively define multiple register sets for subsequent reads issued by the miner controller 210. In various embodiments, the compute modules 222 may support up to eight RegSet configurations. However, other embodiments may support a greater number or a lesser number of RegSet configurations. As shown, each RegSet configuration may comprise an address field, a size field, and a latency field. In various embodiments, the address field is a 16-bit field, the size field is a 2-bit field, and the latency field is a 10-bit field.

The address field may store an address that identifies a register 224 of the register file 223 to be read via a MCAST_READ_REG command. The size field may encode a number of bits to be read from the register 224. In various embodiments, the compute modules 222 may support 4-bit, 8-bit, 16-bit, and 32-bit reads from corresponding registers 224 of the register file 223. In such embodiments, the size field may encode the number of bits to be read as 4*2 size, where size is the 2-bit value stored in the size field. More specifically, the size field in such embodiments may store the binary values 00, 01, 10, 11 to respectively encode 4-bit, 8-bit, 16-bit, and 32-bit reads.

The latency field may encode a bit delay from the last bit of the MCAST_READ_REG command to the transmission of the first bit read from the register 224 associated with the respective register set. The latency field may encode the bit delay in 4-bit (i.e., nibble) granularity. Furthermore, the miner controller 210 may configure the RegSet configurations of the compute modules 222 such that each compute module 222 transmits values for a specific RegSet configuration back to the miner controller 210 in a non-overlapping manner. Thus, by appropriately encoding the bit delay of the RegSet configurations, the miner controller 210 may effectively assign each compute module 222 of a respective RegSet configuration a non-overlapping slot in which to return the values read from their register 224 in the respective register set.

Figure 6:
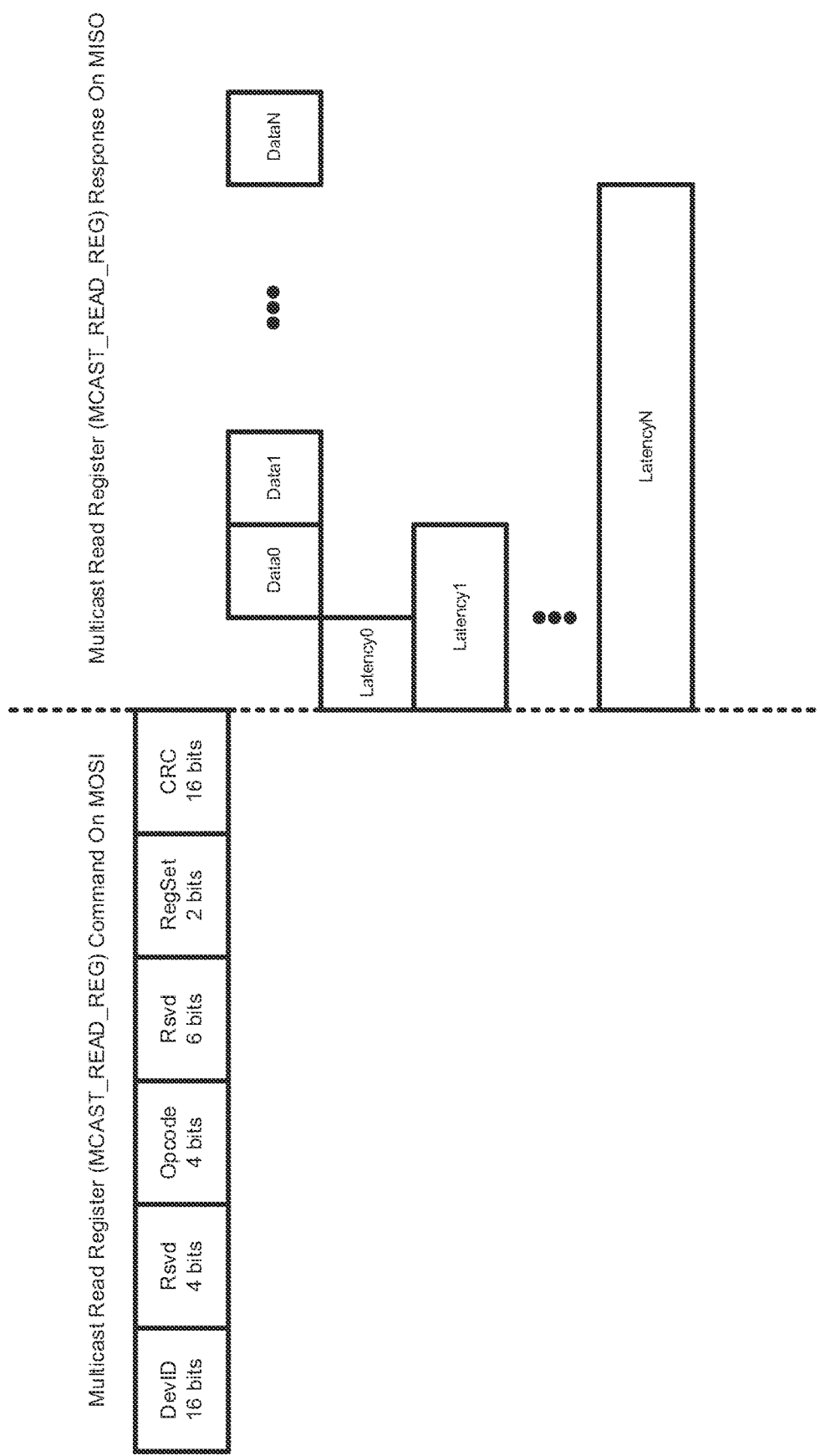
FIG. 6 shows an example multicast read command format used by the miner controller of FIG. 2.

Such non-overlapping nature of the returned values may be better appreciated with reference to FIGS. 5 and 6. In particular, FIG. 5 depicts a general format for commands issued by the miner controller 210. FIG. 6 depicts aspects of a MCAST_READ_REG command issued by the miner controller 210 and the responses of the compute modules 222 to the issued MCAST_READ_REG command. The order and size of fields of the general command format depicted in FIG. 5 are merely presented for context. The order and size of such fields may vary among embodiments. Similarly, The order and size of fields of the MCAST_READ_REG command format depicted in FIG. 6 are merely presented for context. The order and size of such fields may vary among embodiments.

Referring now to FIG. 5, the miner controller 210 may issue commands per the depicted command format to control operation of the compute modules 222. In various embodiments, the commands are 8-bit aligned to ease parsing and generation at a hardware and software level. As shown, the command may include a device identifier (DevID) field, a reserved (Rsvd) field, an opcode (Opcode) field, a command data (Command Data) field, and a cyclical redundancy check (CRC) field.

The DevID field may comprise a 16-bit field that stores a device identifier that may be used as a unicast or multicast address for identifying the destination of the command. In various embodiments, up to a predetermined number of addresses (e.g., six) may be associated with each compute module 222, and each compute module 222 may accept and process any command that has a device identifier in its DevID field that matches one of its associated addresses. In various embodiments, all addresses associated with a compute module 222 are initially reset to a predefined reset value (e.g., 0xffffffff), which represents an uninitialized address.

The Opcode field specifies an operation that the destination device or devices are to perform in response to the received command. In various embodiments, the Opcode field may specify one of a no operation (NOP) operation, a write register (WRITE_REG) operation, a read register (READ_REG) operation, a multicast read register (MCAST_READ_REG) operation, an atomic read-and-set (READ_AND_SET_REG) operation, or a job submit (JOB_SUBMIT) operation. The NOP operation results in the destination device performing no operation in response to the received command. The WRITE_REG operation results in the destination device writing a value specified by the Command Data field to a destination device register specified by the Command Data field. The READ_REG operation results in the destination device returning data read from a destination device register specified by the Command Data field. The MCAST_READ_REG operation results in multiple destination devices returning data read from respective destination device registers specified by the Command Data field. The READ_AND_SET_REG operation results in an atomic read-and-set in which the register value is atomically reads and set to 1 if it was previously 0. Finally, the JOB_SUBMIT operation submits a cryptographic job (e.g., a hashing job) to the destination device.

To support transferring such commands to the compute modules 222, the miner controller 210 may assign addresses to the compute modules 222 per an enumeration process. Per such an enumeration process, the miner controller 210 may assign a unique unicast address and one or more multicast address to each compute module 222. In particular, the miner controller 210 may assign a unique unicast address to each compute module 222 and may assign a same multicast address to multiple compute modules 222. After such address assignments, the miner controller 210 may send a command to a specific compute module 222 by populating the DevID field of the command with the unicast address that was uniquely assigned to it. Conversely, the miner controller 210 may simultaneously send a command to a group of compute modules 222 by using a multicast address that was assigned to each compute module 222 in the respective group of compute modules 222.

Referring now to FIG. 6 specifics of the MCAST_READ_REG command and compute module 222 responses to the MCAST_READ_REG command are shown. In general, the miner controller 210 may issue the MCAST_READ_REG command to the compute modules 222 via the MOSI line of the serial bus 330. In turn, the compute modules 222 targeted by the MCAST_READ_REG command may reply to the miner controller 210 with the value from their respective registers 224 via the MISO line of the serial bus 330.

More specifically, the MCAST_READ_REG command may comprise a RegSet field in addition to the DevID, Rsvd, Opcode, and CRC fields described above with regard to the general command format of FIG. 5. In various embodiments, the RegSet field is a 2-bit field. The RegSet field may identify to which of the pre-configured RegSet configurations of the register file 223 the MCAST_READ_REG command is directed. Based on the register field of the RegSet configuration identified by the RegSet field, the compute module manager 225 may determine from which register 224 the MCAST_READ_REG command is reading. Moreover, based on the latency field of the RegSet configuration identified by the RegSet field, the compute module manager 225 may determine when the compute module 222 is to return the value of the identified register 224 to the miner controller 210 via the MISO line of the serial bus 330.

As shown, each compute module 222 may return the value of its identified register 224 based on the latency set forth in the RegSet configuration. For example, a first compute module 222 may return to the miner controller 210, in response to a MCAST_READ_REG command, a value Data0 from its register 224 via the MISO line upon expiration of a latency Latency0 specified by its RegSet configuration. Similarly, a second compute module 222 may return to the miner controller 210, in response to the same MCAST_READ_REG command, a value Data1 from its register 224 via the MISO line upon expiration of a latency Latency1 specified by its RegSet configuration. Further yet, a third compute module 222 may return to the miner controller 210, in response to the same MCAST_READ_REG command, a value DataN from its register 224 via the MISO line upon expiration of a latency LatencyN specified by its RegSet configuration. Thus, by appropriately configuring the RegSet configurations of the compute modules 222, the miner controller 210 may read a register value from multiple compute modules 222 via a single MCAST_READ_REG command.

Figure 7:
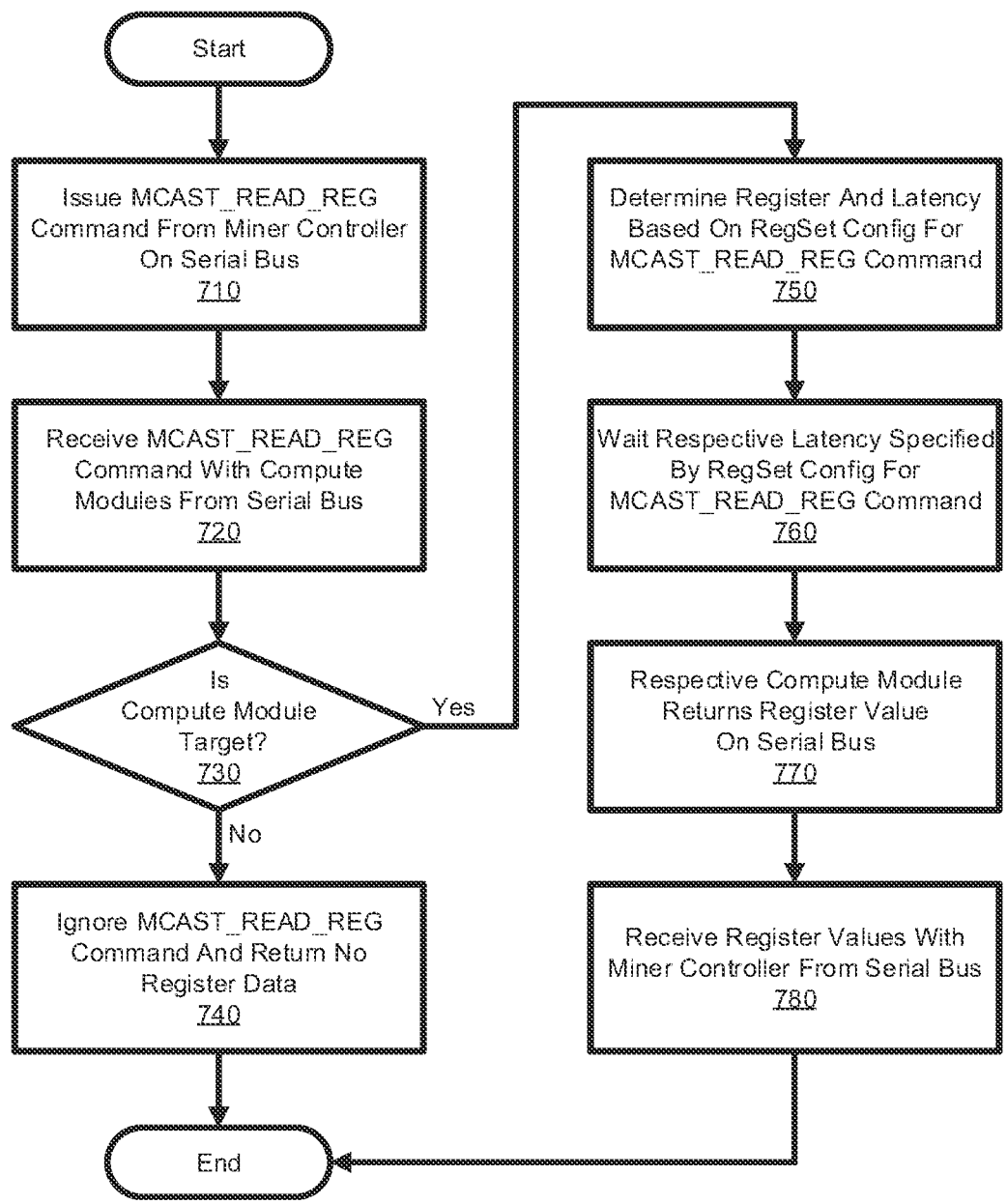
FIG. 7 depicts a flowchart for an example multicast read process used by the miner of FIG. 2.

Referring now to FIG. 7, a flowchart of an example process of reading register values is shown. The process of FIG. 7 assumes the miner controller 210 has already pre-configured, pre-defined, or otherwise initialized RegSet configurations of the compute modules 222. In various embodiments, such pre-configuration may occur in response to a system boot up or other initialization event.

At 710, the miner controller 210 may issue a MCAST_READ_REG command on the MOSI line of the serial bus 330. To this end, the miner controller 210 may populate the DevID field of the MCAST_READ_REG command with a device identifier or multicast address associated with a plurality of the compute modules 222. The miner controller 210 may further populate the RegSet field with a value that identifies the RegSet configuration for the register set to be read.

At 720, the compute modules 222 may receive the MCAST_READ_REG command via the MOSI line of the serial bus 330. The compute module manager 225 of each compute module 222 at 730 may determine whether the MCAST_READ_REG command is directed to the respective compute module 222. To this end, the compute module manager 225 may determine that the MCAST_READ_REG command is directed to the compute module 222 if the device identifier in DevID field of the received MCAST_READ_REG command corresponds to a multicast address of the compute module 222.

If the MCAST_READ_REG command is not directed to the respective compute module 222, the respective compute module manager 225 at 740 may ignore the MCAST_READ_REG command and not return data from a register 224. Conversely, if the MCAST_READ_REG command is directed to the respective compute module 222, then the compute module manager 225 may determine at 750 the register 224 being read and the associated latency based on the RegSet configuration identified by the RegSet field of the received MCAST_READ_REG command.

At 760, the compute module managers 225 of the targeted compute modules 222 waits a quantity of nibbles or bits from the end of the MCAST_READ_REG command as specified by the latency of the identified RegSet configuration. After awaiting its specified latency, the compute module manager 225 at 770 causes its respective compute module 222 to return the value stored at the identified register 224. In particular, the compute module 222 may return the register value of the identified register 224 to the miner controller 210 via the MISO line of the serial bus 330. At 780, the miner controller 210 may receive in succession the register values that the targeted compute modules 222 returned in their respective non-overlapping.

While the foregoing has been described with reference to certain aspects and examples, those skilled in the art understand that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular examples disclosed, but that the disclosure includes all examples falling within the scope of the appended claims.

What is claimed is:

1. A compute integrated circuit for a cryptocurrency miner, the compute integrated circuit comprising:
   an interface to a shared bus;
   a register file comprising a plurality of registers and a programmable register set configuration, wherein the programmable register set configuration specifies a register of the register file and a latency that specifies a beginning for a slot of the shared bus in which to return a value from the specified register on the shared bus; and
   a manager configured to:
      receive a multicast read command via the interface to the shared bus;
      identify, based on the programmable register set configuration, the specified register of the register file to be read by the multicast read command and the slot in which to return the value from the specified register; and
      return, via the interface to the shared bus, the value from the specified register in the slot specified by the latency of the programmable register set configuration.

2. The compute integrated circuit of claim 1, wherein: the register file is configured to store a plurality of programmable register set configurations; and the manager is configured to select the programmable register set configuration from the plurality of programmable register set configurations based on one or more fields of the multicast read command.

3. The compute integrated circuit of claim 1, wherein latency of the programmable register set configuration specifies the beginning of the slot as a number of bits after receipt of the multicast read command to wait before returning the value from the specified register in the slot of the shared bus via the interface to the shared bus.

4. The compute integrated circuit of claim 1, wherein the programmable register set configuration specifies the latency at 4-bit granularity.

5. The compute integrated circuit of claim 1, wherein the manager is configured to determine, based on a device identifier of the received multicast read command, that the received multicast read command is directed to the compute integrated circuit.

6. The compute integrated circuit of claim 1, wherein the manager is configured to determine that the received multicast read command is directed to the compute integrated circuit before returning the value from the specified register in the slot of the shared bus.

7. A cryptocurrency miner comprising:
   a serial bus;
   a miner controller; and
   compute integrated circuits, wherein each compute integrated circuit is coupled to the miner controller via the serial bus and comprises a register file, wherein each register file comprises a plurality of registers and a programmable register set configuration, and wherein each programmable register set configuration specifies a register of the respective register file and specifies a slot of the serial bus in which to return a value from the specified register to the miner controller; and
   wherein the miner controller is configured to issue a multicast read command via the serial bus and receive, in response to the issued multicast read command, values from respective specified registers of a first plurality of the compute integrated circuits via respective non-overlapping slots of the serial bus.

8. The cryptocurrency miner of claim 7, wherein the miner controller is configured to program the programmable register set configuration for each of the first plurality of the compute integrated circuits such that each programmable register set configuration specifies a respective register of each compute integrated circuit in the first plurality of the compute integrated circuits to be read by a subsequently issued multicast read command.

9. The cryptocurrency miner of claim 8, wherein the miner controller is configured to program each programmable register set configuration of the first plurality of the compute integrated circuits such that each compute integrated circuit of the first plurality of the compute integrated circuits has a programmed latency that specifies a slot for the specified register to be read that differs from the programmed latencies that specifies slots for the other compute integrated circuits in the first plurality of the compute integrated circuits.

10. The cryptocurrency miner of claim 9, wherein the slot for each compute integrated circuit of the first plurality of the compute integrated circuits begins after expiration of its programmed different latency.

11. The cryptocurrency miner of claim 10, wherein the programmed latency specifies a number of bits for the respective compute integrated circuit to wait after receipt of the multicast read command before returning its value from its specified register on serial bus.

12. The cryptocurrency miner of claim 11, wherein the programmed latency is specified at 4-bit granularity.

13. The cryptocurrency miner of claim 7, wherein the miner controller is configured to program the first plurality of the compute integrated circuits with a multicast address shared by each compute integrated circuit in the first plurality of the compute integrated circuits.

14. The cryptocurrency miner of claim 13, wherein each compute integrated circuit of the first plurality of the compute integrated circuits is configured to determine, based on the multicast address, that the multicast read command is directed to the compute integrated circuit before returning the value from its specified register on the serial bus.

15. The cryptocurrency miner of claim 7, wherein:
the miner controller is configured to program each compute integrated circuit with a respective plurality of programmable register set configurations; and
each compute integrated circuit in the first plurality of the compute integrated circuits is configured to select the programmable register set configuration from the plurality of programmable register set configurations based on one or more fields of the multicast read command.

16. A method of a cryptocurrency miner comprising a miner controller coupled to a plurality of compute integrated circuits via a serial bus, the method comprising:
programming a first register set configuration for a first compute integrated circuit of the plurality of compute integrated circuits to specify a first register of a plurality of registers of the first compute integrated circuit to be read by a multicast read command and specify a first slot of the serial bus in which to return a first value from the first register;
after the programming the first register set configuration, issuing, from the miner controller, the multicast read command to the plurality of compute integrated circuits via the serial bus of the cryptocurrency miner;
receiving the multicast read command at each of the plurality of compute integrated circuits;
identifying, with the first compute integrated circuit, the first register of the first compute integrated circuit based on one or more fields of the multicast read command and the first register set configuration; and
returning the first value from the identified first register of the first compute integrated circuit via the first slot of the serial bus specified for the identified first register.

17. The method of claim 16, comprising:
programming a second register set configuration for a second compute integrated circuit of the plurality of compute integrated circuits to specify a second register of a plurality of registers of the second compute integrated circuit to be read by the multicast read command and a second slot of the serial bus in which to return a second value from the second register;
identifying, with the second compute integrated circuit, the second register of the second compute integrated circuit based on one or more fields of the multicast read command and the second register set configuration; and
returning the second value from the identified second register of the second compute integrated circuit via the second slot of the serial bus specified for the identified second register.

18. The method of claim 17, wherein:
the first register set configuration specifies a first programmable latency that specifies a beginning of the first slot for the first compute integrated circuit to return the first value from the first register;
the second register set configuration specifies a second programmable latency that specifies a beginning of the second slot for the second compute integrated circuit to return the second value from the first register; and
the second programmable latency results in returning the second value on the serial bus after the first value is returned on the serial bus.

19. The method of claim 17, wherein:
the first register set configuration specifies a first programmable latency that specifies a beginning of the first slot for the first compute integrated circuit to return the first value from the first register;
the second register set configuration specifies a second programmable latency that specifies a beginning of the second slot for the second compute integrated circuit to return the second value from the first register; and
the first programmable latency and the second programmable latency result in the first value and the second value not overlapping on the serial bus.

20. The method of claim 17, comprising:
determining, with the first compute integrated circuit, that a device identifier of the multicast read command corresponds to a first multicast address of the first compute integrated circuit prior to returning the first value from the first compute integrated circuit;
determining, with the second compute integrated circuit, that the device identifier of the multicast read command corresponds to a second multicast address of the second compute integrated circuit prior to returning the first value from the second compute integrated circuit; and
determining, with a third compute integrated circuit, to return no value in response to the device identifier of the multicast read command not corresponding to any address of the third compute integrated circuit.

* * * * *